Figure 1:
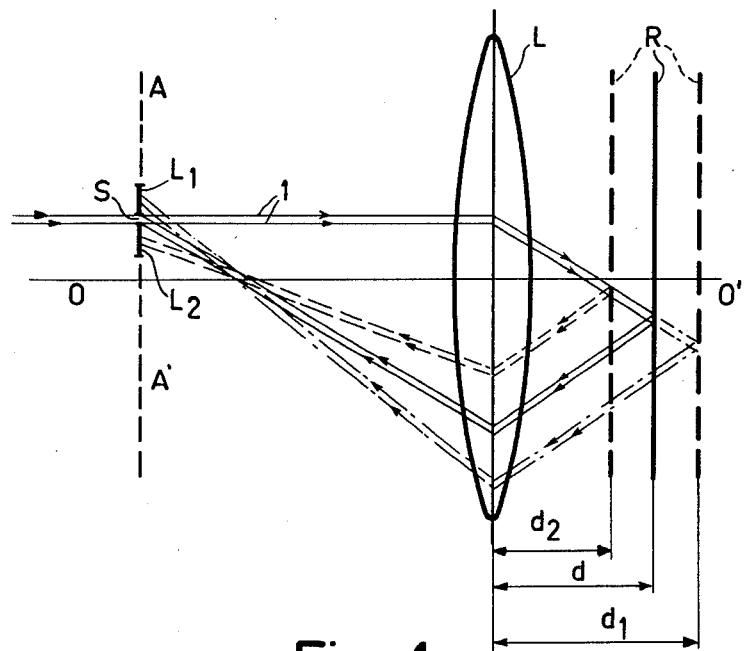

United States Patent [19]
Janssen

[11] 3,976,828
[45] Aug. 24, 1976

[54] ARRANGEMENT FOR ALIGNING THE IMAGE OF AN INFORMATION STRUCTURE ON A CONVERTER

[75] Inventor: Peter Johannes Michiel Janssen, Eindhoven, Netherlands

[73] Assignee: U.S. Philips Corporation, New York, N.Y.

[22] Filed: Jan. 28, 1975

[21] Appl. No.: 544,854

[30] Foreign Application Priority Data
Feb. 9, 1974  Netherlands............... 7401805

[52] U.S. Cl. .................. 178/6.6 R; 178/6.6 DD; 178/6.7 A; 179/100.3 V
[51] Int. Cl.² ..................... H04N 5/76; G11B 7/00
[58] Field of Search ............ 179/100.3 V, 100.41 L, 179/100.4 R; 178/6.6 R, 6.6 DD, 6.6 P, 6.7 A; 360/75, 77, 78, 86, 97, 98–99, 102, 104–107, 109; 318/135; 310/13–19; 324/100; 250/201, 234

[56] References Cited
UNITED STATES PATENTS

| | | | |
|---|---|---|---|
| 2,581,133 | 1/1952 | Niemann | 324/100 |
| 3,391,255 | 7/1968 | Gregg | 179/100.3 V |
| 3,521,092 | 7/1970 | Kalthoff | 310/13 |
| 3,544,980 | 12/1970 | Applequist | 360/106 |
| 3,576,454 | 3/1968 | Beach | 310/16 |
| 3,833,769 | 9/1974 | Compaan et al. | 179/100.3 V |
| 3,842,197 | 10/1974 | Broussaud et al. | 179/100.3 V |

Primary Examiner—Raymond F. Cardillo, Jr.
Attorney, Agent, or Firm—Frank R. Trifari; Simon L. Cohen

[57] ABSTRACT

An arrangement for focussing an image of an information structure which is disposed on or in a substantially flat record carrier, light being projected onto the light-sensitive detector via an optical element and a record carrier, which detector via a control system controls the optical element, the control system also receiving a signal which is a measure of the velocity of movement, which signal limits said velocity of movement.

5 Claims, 4 Drawing Figures

ARRANGEMENT FOR ALIGNING THE IMAGE OF AN INFORMATION STRUCTURE ON A CONVERTER

The invention relates to an arrangement for aligning the image of an information structure which is disposed on or in a substantially flat record carrier by means of an optical element. This arrangement is provided with a light source which via the optical element and the record carrier projects a light beam onto a light-sensitive detector, which light-sensitive detector is connected to a control system which controls the optical element. In this application the term "alignment" refers to the process wherein the optical element is moved from an unfocussed position remote from the record carrier to a nominally focussed position close to a surface of the record carrier.

Such an arrangement is inter alia known from a prior art system, in which a light beam at some distance from and parallel to the optical axis of the optical element is projected onto said element. The beam is diffracted therein and is reflected by the information carrier. The reflected beam is again imaged through the optical element onto a plane which corresponds to the desired image plane of the information structure. In this plane a light-sensitive detector is disposed which consists of two light-sensitive elements which are separated by a narrow gap. If the image of the information structure is disposed in the desired image plane, the reflected light beam is imaged on the narrow gap between the two light-sensitive elements and said elements supply the same signal. If the information structure is too near to the optical element, the image of the information structure will be disposed in front of the desired image plane and the reflected light beam will fall beside the gap so that the one light-sensitive element receives more light and consequently supplies a greater signal than the other element, the control system is rendered operative and the optical element, which in the present case consists of a single lens is moved so far from the information structure that the image thereof is correctly positioned. In the case that the information structure is too far from the optical element, the optical element will be moved towards the information structure.

The latter case presents itself, for example when putting a record carrier, for example a video disc on a turntable. The optical element is then retracted so far that the record carrier cannot come into contact with said element when putting on said record carrier, so that damaging of the record carrier is avoided. However, the desired nominally focussed distance between the optical element and the record carrier is so small (of the order of 250 microns) and during alignment the velocity of movement is so high that the optical element can move so far beyond the desired position that damaging of the record carrier is not unlikely.

In order to eliminate this drawback, according to the invention, the optical element is connected to an arrangement which supplies a signal which is a measure of the velocity of movement of the optical element, the output of the arrangement leading to a second input of the control system.

The velocity may be detected in several manners, for example by measuring the variation of the capacitance of two adjacent metal plates.

According to an advantageous embodiment of an arrangement according to the invention, the arrangement consists of a tacho-generator coil. The coil can be fixed around the optical element in a very simple manner and can co-operate with a magnet system which is accommodated in a housing in which the optical element is movably disposed. The voltage which is induced in the coil is then proportional to the velocity with which the optical element is moved.

In a further embodiment of an arrangement according to the invention a threshold circuit is included between the arrangement and the second input of the control system, which circuit supplies an output signal when the velocity signal exceeds a certain value.

By applying the voltage to the control amplifier in such a way that the voltage counteracts an increase of the gain or even causes a decrease therein, the velocity of the optical element is limited to such value that the control system is capable of sufficiently braking said element when the correct point is reached. Of course, it is possible to select said threshold of the threshold device symmetrically relative to the direction of the velocity. This is to be preferred in the case of systems in which the information structure is located at that side of the record carrier which faces the optical element. However, if the information structure is located at the other side and the radiation beam traverses the record carrier material to be reflected at the other side or if a light-transmitting system is used, the system, for example if there is a stain at the side which faces the optical element, will tend to respond rapidly to the stain, which is undesirable. In that case, preferably when the optical element is moved away from the information structure, the velocity is reduced, i.e. the threshold lowered.

Therefore, according to another embodiment of an arrangement according to the invention it is advantageous to select the threshold asymmetrically relative to the direction of the velocity, so that the influence on the velocity in one direction differs from the other direction.

Figure 4:
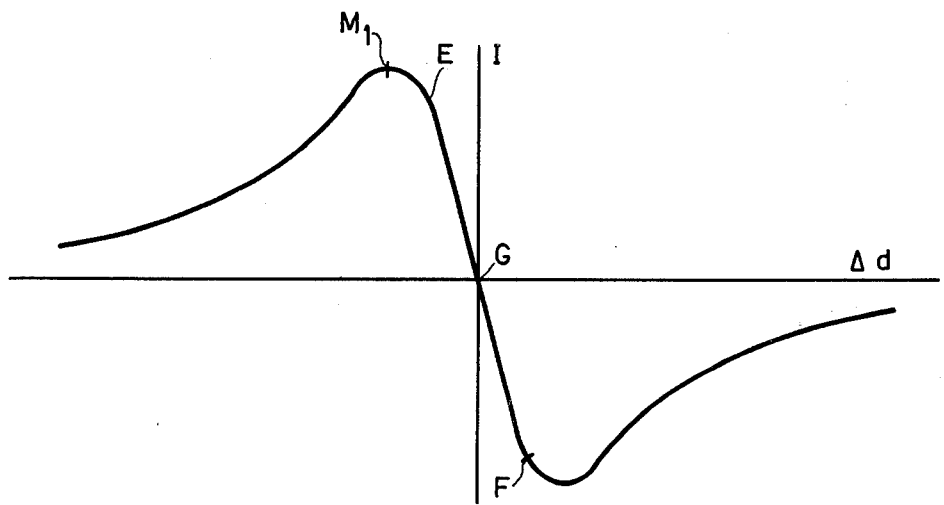
Figure 2:
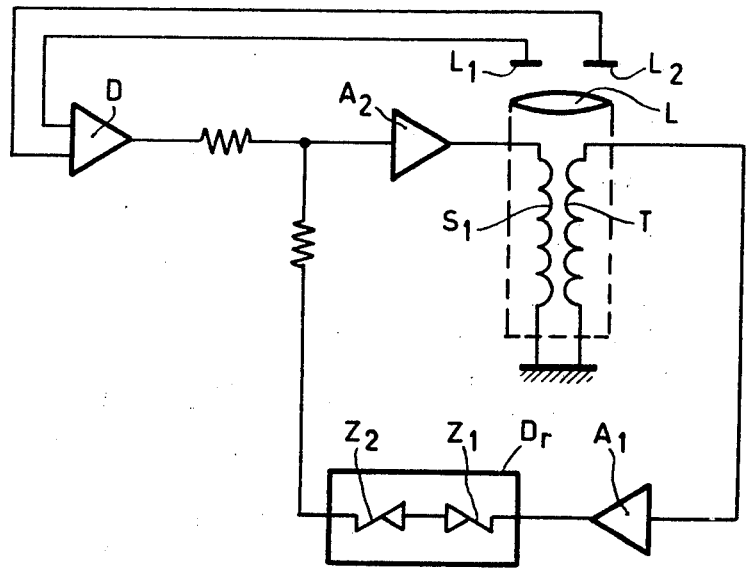
Figure 3:
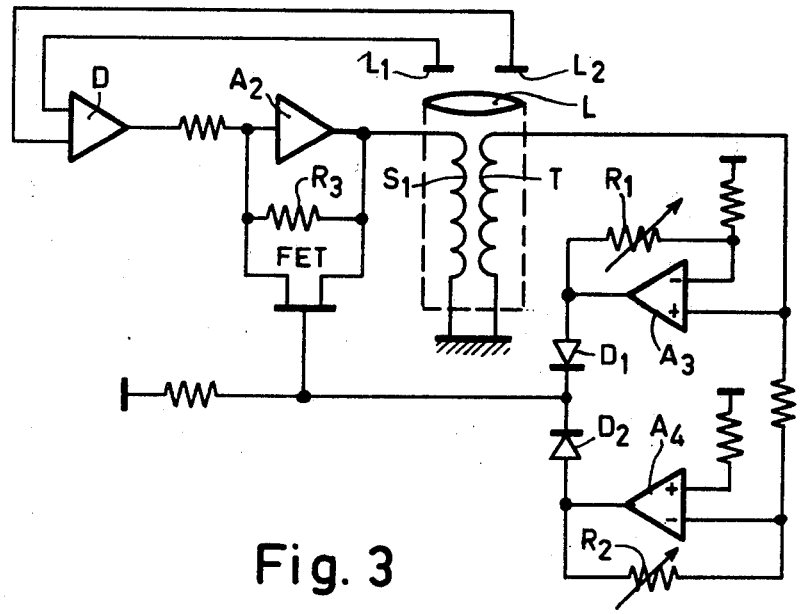

The invention will now be explained in more detail by way of example, with reference to the following description, in which FIG. 1 shows how a change of the position of the optical element affects the path of the light beam, FIG. 2 shows a control system in which the threshold of the threshold device is symmetrical relative to the direction of the velocity, FIG. 3 shows such an arrangement with an asymmetrical threshold, and FIG. 4 is a graph of the control voltage and current of the control amplifier respectively as a function of the displacement.

FIG. 1 shows how a light beam 1 is projected onto the optical element L parallel to the optical axis 0—0' and is diffracted therein and reflected back by the record carrier R and via the optical element L returns to the image plane A—A'. On its way to the optical element L the beam passes a gap S which separates two light-sensitive elements $L_1$ and $L_2$ which are disposed in the image plane A—A'. When the record carrier is located at the correct distance d from the optical element L, the ray travel as indicated by the uninterrupted lines. In the present case the image of the light beam coincides with the gap S. When the distance from the optical element L to the record carrier R is greater than the desired distance, for example a distance $d_1$, the radiation path is as indicated by the dash-dot line and the image of the radiation beam is located in front of the image plane A—A', which means that the light-sensitive element $L_1$ receives more light than the light-sensitive element $L_2$, so that said light sensitive element $L_1$ supplies a higher voltage or has a lower resistance than the light-sensitive element $L_2$. When the distance from the record carrier is smaller than the desired distance, for example, the distance $d_2$, the light beam is imaged behind the image plane A–A' as is indicated by the dotted line and the light-sensitive element $L_2$ receives more light than the light-sensitive element $L_1$, so that the element $L_2$ supplies a higher voltage or has a lower resistance than the element $L_1$.

FIG. 2 shows a control system consisting of a control loop which includes a differential amplifier D to which both the voltage from the light-sensitive element $L_1$ and the voltage from the light-sensitive element $L_2$ are applied. The output voltage of the differential amplifier D is fed to a control amplifier $A_2$ which drives a coil $S_1$ which is connected to the optical element L. This coil is disposed in a constant magnetic field and will be moved when a current is fed through it. Thus, said control loop controls in response to the positional deviation of the optical element L. The output voltage of the tacho-generator T, which in the present case consists of a coil which is disposed around and connected to the optical element L, and which is preferably disposed on the same coil form as the coil $S_1$, is a measure of the velocity of the optical element L and is applied via an amplifier $A_1$ to the series connection of two identical oppositely connected Zener diodes $Z_1$ and $Z_2$ which form a threshold circuit $D_r$ whose threshold is symmetrical relative to the direction of the velocity. The output voltage of the series connection of the Zener diodes $Z_1$ and $Z_2$ is fed to an input of the control amplifier $A_2$ which provides the displacement of the optical element L, and this output voltage is opposed to the voltage which occurs as a result of the positional deviation and which provides the displacement of the coil $S_1$. Thus, the velocity of the optical system is limited to a specific value.

This is illustrated in FIG. 4 which shows the relationship between the current I through the coil $S_1$ of the optical element L and the displacement $\Delta d$ of the optical element L relative to the position of the record carrier R at the nominal distance from the optical element L.

The uninterrupted line shows the relationship in the case that only positional control is provided.

When a record carrier is put on, the optical element L is disposed at a distance $\Delta d$ of approximately 3 mm from said record carrier. After switching on the player, i.e. the control system, the current I which flows through the coil $S_1$ and by which the optical element L is moved, initially increases to a maximum $M_1$ after which it decreases substantially linearly and is then reversed and increases again, which process takes place in the lock-in range which is represented by the line EF. This lock-in range is for example ± 100 $\mu$ for the video long-playing record. As the acceleration is proportional to the current, the velocity increases and upon reaching the correct position it has become so high that the optical element L in the range GF can no longer be braked sufficiently and the record carrier R is contacted by the optical element and damaged.

When the velocity control is provided, the current through the coil $S_1$ decreases to a value of zero as soon as the threshold value of the velocity is attained, so that the velocity is limited to such a value that the optical element can be braked rapidly enough after passage beyond point G.

In the case of a system in which the information structure is disposed at the side of the record carrier R remote from the optical element L, the system in the case of for example a stain on the side nearest the optical element L tends to respond thereto. This is undesirable and may be avoided by making the loop gain of the control system in the direction toward the record carrier so low that it cannot follow the sudden variations in this direction produced by the interaction of the stain and the light beam.

This may also be achieved with the circuit of FIG. 2 by selecting types with different Zener voltages for the Zener diodes $Z_1$ and $Z_2$.

FIG. 3 shows a similar control system which is provided with a different threshold circuit. This circuit consists of two operational differential amplifiers $A_3$ and $A_4$ in which the gain can be adjusted individually by means of the variable resistors $R_1$ and $R_2$.

The two amplifiers $A_3$ and $A_4$ are not symmetrical relative to ground, so that $A_3$ operates only in the case of deviations of the velocity of the optical element L in one direction and $A_4$ in the case of deviations of the velocity in the other direction, so that either the diode $D_1$ or the diode $D_2$ is conductive. The current through said diodes determines the voltage at the gate electrode of the field-effect transistor FET which is connected in parallel with the resistor $R_3$. This in turn determines the gain of the amplifier $A_2$. At increasing voltage at the gate electrode the resistance between the source and the drain electrode of the field-effect transistor FET decreases and thus the gain of the amplifier $A_2$ and the current I through the coil $S_1$ decrease.

By means of this circuit the gain factors of the two amplifiers $A_3$ and $A_4$ can be adjusted individually to any arbitrary value, so that it is possible by means of this circuit to obtain both a symmetric and an asymmetric threshold of which the values are continuously variable.

What is claimed is:

1. An arrangement for focussing an image of an information structure which is disposed on or in a substantially flat record carrier on a transducer by means of an optical element, comprising a light-sensitive detector, a light source aligned with the optical element for projecting light on the record carrier, means comprising said optical element for projecting light from the record carrier onto said light-sensitive detector, a control system which controls the optical element connected to said light-sensitive detector for controlling the focussing motion of said optical element, and a velocity detector connected to a non-linear velocity correcting means for supplying an electrical signal which is a measure of the velocity of movement of the optical element, said velocity correcting means being operative for detected velocities in excess of a predetermined velocity range, the output of the velocity correcting means being connected to a second input of a control system as a velocity feedback signal whereby detected velocities in excess of said predetermined velocity range are corrected.

2. An arrangement as claimed in claim 1, wherein said velocity detector comprises a tacho-generator coil.

3. An arrangement as claimed in claim 1, wherein the velocity correcting means comprises a threshold circuit which supplies an output signal in response to detected optical element velocity exceeding specific threshold velocities exceeding said velocity range.

4. An arrangement as claimed in claim 3, wherein the threshold value of the threshold circuit is symmetrical relative to the direction of the velocity.

5. An arrangement as claimed in claim 3, wherein the threshold value of the threshold circuit is assymmetrical relative to the direction of the velocity.

* * * * *